June 7, 1938.  H. H. BLAU ET AL  2,119,947
METHOD AND APPARATUS FOR TREATING GLASS
Filed June 8, 1936   4 Sheets-Sheet 3

INVENTORS.
Henry H. Blau
BY Kenneth K. Knaell
Brown, Critchlow & Flick
ATTORNEYS.

WITNESSES
B. Wallace.
E. O. Johns

June 7, 1938.　　　H. H. BLAU ET AL　　　2,119,947
METHOD AND APPARATUS FOR TREATING GLASS
Filed June 8, 1936　　　4 Sheets-Sheet 4

Patented June 7, 1938

2,119,947

UNITED STATES PATENT OFFICE 2,119,947

METHOD AND APPARATUS FOR TREATING GLASS

Henry H. Blau and Kenneth K. Knaell, Charleroi, Pa., assignors, by mesne assignments, to Corning Glass Works, Corning, N. Y., a corporation of New York Application June 8, 1936, Serial No. 84,026

19 Claims. (Cl. 49—54)

This invention relates to glass-melting tanks and methods of melting and refining glass, and is concerned with improvements therein for bettering the quality and increasing the quantity of glass produced in tanks.

In the production of glass in continuous tanks or in day tanks it is highly desirable uniformly to melt, mix, and refine the glass throughout the entire tank thereby to improve the quality and increase the quantity of the glass. Likewise, it is important to employ tank structures adapted for uniformly heating the glass, the structures having relatively low initial and maintenance costs and adapted to control convectional flow of glass therein.

In prior tank constructions and methods of melting glass it has been difficult, if not impossible, to produce glass with its full body heated uniformly and having uniform viscosity. Following known practices of heating the glass solely from above, a relatively thin layer of glass at the top of the tank is rendered highly fluid and this glass is removed by normal hydraulic flow frequently at a relatively high rate so that it is not in the tank the necessary length of time to be properly melted down and to be thoroughly refined. Moreover, portions of the glass in the tank are not properly heated and remain heavy and viscous and may be in the furnace for too long a time. The capacity of the tank may be materially reduced due to the large quantities of viscous non-moving glass therein, and a non-uniform, low-quality glass is quite apt to be produced.

In former tank constructions relatively large blocks of refractory have been employed for forming the side, end and bottom walls, and it has been difficult to make repairs on the tank without completely tearing down the whole of its structure. It has also been substantially impossible to effect transfer of heat through the side, end and bottom walls of a tank of this heavy block construction, although the walls of tanks have been cooled by directing currents of cold air against them. However, cooling of this character does not improve the melting and mixing of the glass in the tank, and heavy viscous layers and bodies of glass are often present in the tanks for long periods which adversely affect the quality and quantity of glass produced in them.

It is an object of the present invention to avoid and overcome the foregoing and other objections of known glass-melting practices and tank structures by the provision of improved means and methods for effecting proper mixing and melting of the glass to increase the quantity and improve the quality of glass produced in a tank.

Another object of the invention is to provide a tank structure which is particularly adapted locally to apply heat through, maintain heat in or withdraw heat from the walls of the tank in contact with the glass, whereby materially improved mixing and melting of the glass in the tank results.

Another object of the invention is to provide a glass tank having relatively low initial and maintenance costs, and in which hot repairs can readily be made upon any particular course or portion of the refractory structure of the tank.

Another object of the invention is the provision of means and methods for controlling the convectional flow of glass in day tanks or continuous tanks to increase the amount and improve the character of the glass produced.

Another object of the invention is to provide a tank structure in which relatively thin cast refractory blocks of relatively high heat conductivity are employed in direct contact with the glass so that heating and cooling conduits associated with the cast refractories can be employed to control the location and quantity of heat flow through the refractories to or from the glass proper.

The stated objects of our invention may be obtained by effecting a controlled convectional flow of glass in a tank with the glass being heated both upon its upper surface and through the side, end or bottom walls of the tank whereby the entire body of glass is thoroughly heated and rendered fluid and of substantially the same viscosity, the fluid glass being mixed by established and controlled convectional current action to improve materially the character and increase the quantity of the glass so made.

One embodiment of a tank structure built in accordance with the principles of our invention comprises bottom, side and end walls constructed of a plurality of cast refractory, channel-shaped blocks having their channel faces away from the glass with supporting structures for holding the blocks in position and for supporting ordinary refractory blocks over the channel openings in the cast refractory blocks. This arrangement of parts forms closed passageways or conduits in the various walls of the tank, and in or through these passageways provision is made for supplying heat to, maintaining heat in or withdrawing heat from the glass in the tank.

In practicing the method of our invention, heat is applied directly to the upper surface of the glass and simultaneously in zones through the walls of the tank, while in other zones heat may be withdrawn from the tank through its walls. Thus definite convectional currents are established in the glass and a thorough mixing and melting thereof results.

Figures 1, 2:
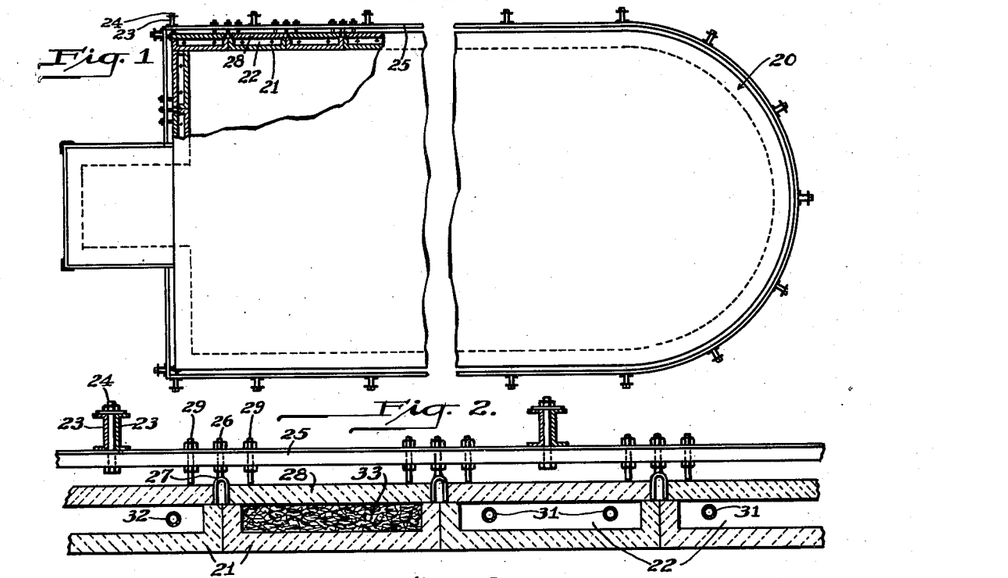
Fig. 1 is a plan view of a tank embodying principles of the invention, a portion of the top being broken away in sectional form to better illustrate the tank construction.
Fig. 2 is a cross-sectional view through the side wall of the tank structure shown in Fig. 1, but on a larger scale.

Referring particularly to Figs. 1 and 2 of the drawings, the numeral 20 indicates generally a glass-melting tank which may be of any known or desired configuration to best serve the particular purpose for which it is built. The feature of tank construction with which the present invention is particularly concerned is so constructing its bottom, side and end walls, or any of them, that heat may be added to, maintained in or withdrawn from the glass in the tank through the walls contacting with the glass. In this manner the glass body can be very uniformly melted, mixed and refined and the quality of the glass produced in any given tank in a given time can be materially improved, and the quantity increased. The invention contemplates several different types of construction which particularly adapt themselves to the building of a tank of the desired characteristics, and in Figs. 1 and 2 the construction includes blocks 21 shaped to define channels 22 and made of cast refractory having relatively high thermal conductivity, the blocks being formed relatively thin so that heat transfer is readily obtained. Making the blocks 21 relatively thin facilitates their casting and likewise reduces their cost because of the lesser amount of material necessitated. While various cast refractories, such as mullite, may be used for forming these and the other cast refractories herein contemplated, it is preferred to use fused cast refractories containing not less than about 80 per cent alumina, the remainder being chiefly silica. Such refractories have high heat conductivity and are highly resistant to corrosion by molten glass.

The channel-shaped blocks 21 are positioned with their flat faces forming the inside of the tank and may be made of various heights and widths so that one, two, three or more courses may be used to form the height of the tank in contact with the glass. Suitable structure is provided to individually support the blocks in position, and in the embodiment illustrated in Figs. 1 and 2 this comprises vertically extending channel irons 23 placed back-to-back and receiving bolts 24 which engage and support horizontally extending back-to-back angles 25. The angles 25 are spaced a slight distance apart to receive bolts 26 formed with bifurcated ends 27 which engage the edges of the flanges of the channel blocks 21 to hold each in position while leaving the butt joint between the blocks exposed to the air so that any glass which may seep therethrough will be chilled upon contacting the air. This arrangement of bifurcated holding means also permits the application of air or other cooling fluid to the butt seams between the blocks 21.

As shown particularly in Fig. 2, slabs 28 span the channels and terminate at the bifurcated holding means 27 so that the seams between the cast blocks 21 remain open for the application of cooling fluid as just described. Individual means, such as bolts 29, are employed for securing each slab 28 in position. This individual supporting structure makes it possible to repair the tank structure while hot with little difficulty as compared with the problems attending repair of prior glass-melting tanks having walls of heavy large-sized blocks. Thus if one course or row of blocks 21 has been severely attacked, as for example, those blocks adjacent the metal line of the tank, then the level of the glass can be dropped in the tank and the individual screw means supporting the particular blocks at the metal line can be loosened to permit the removal of the corroded blocks and the substitution of new blocks. It is the individual support for each block and slab which renders repair jobs of this type possible together with the fact that the cast refractory is relatively small and proportionately light as compared with thick, heavy blocks of bonded refractory heretofore generally employed in tank construction.

A feature of the invention is the provision of means in the channels formed in the cast refractory blocks for applying heat to, maintaining heat in, or withdrawing heat from the channels and thus the glass in contact with the blocks 21 defining the channels. In Fig. 2, for example, the numerals 31 indicate burners for supplying heat to the channels. Inasmuch as the cast refractory blocks are very highly resistant to heat and corrosive action, and because the cast refractory has relatively high thermal conductivity, there is provided a structure wherein the amount and direction of application of heat to the bottom and sides of the glass in the tank can be effectively and advantageously controlled. Instead of the application of heat in the channels, cooling fluid can be circulated through them, as by means 32, to withdraw heat from the glass, or insulating means such as infusorial earth or the like, indicated at 33, can fill the channels to maintain heat in the glass. Again, combinations of heating, cooling or insulating may be utilized as hereafter more fully explained.

Inasmuch as the amount of heat which it is necessary to remove through the wall in a given area in order to accomplish the desired results is often quite large, it has been found that at times it is desirable to supplement the air cooling of the refractory by water or other fluid carrying pipes placed in or closely adjacent the cooling air channels. In the former case the heat is transferred to these pipes partly by radiation from the hot surfaces around them and partly by contact with the heated air, which air is thus cooled to a temperature at which it becomes able to again pick up heat upon recontact with the hot surfaces in its passage through the channel. The rate of circulation of cooling fluid within the pipes may be varied over a wide range, thus permitting a much more extensive and yet finely flexible control over wall temperatures than is possible with air cooling alone or water cooling alone.

In case it is desired to closely restrict the cooled area, for example to cool the metal line without greatly cooling adjacent areas, it is desirable to place insulating material along the side of the cooling channel into which it is desired that little or no heat be drawn. Such a construction is readily combinable with either air or water cooling or both.

Figure 3:
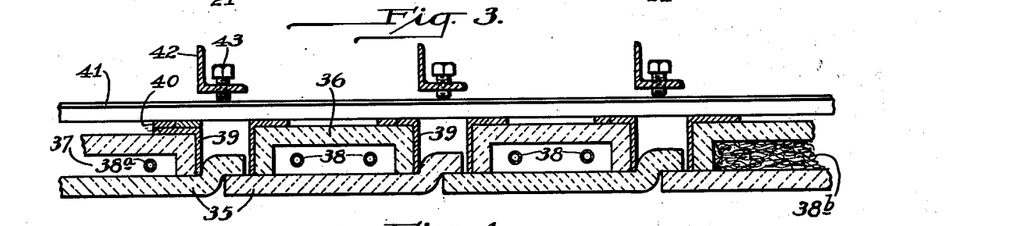
Fig. 3 is a cross-sectional view through a wall of a tank illustrating a modified construction.

The embodiment of the invention illustrated in Fig. 3 differs from that shown in Figs. 1 and 2 in that the portions of the walls in engagement with the glass in the tank are made of cast refractory blocks 35 which have lap joints. It has been found that lap joints of the type illustrated are better adapted to resist corrosive attack than butt joints. The blocks may be made of such a height and width that one or more courses of them are required to form the height of the tank in contact with the glass. Associated with the cast refractory blocks 35 are channel-shaped blocks 36 which are preferably made of ordinary bonded refractory that adequately serves the intended purpose and is less expensive than cast refractory. Channels 37 are accordingly formed, and means are associated with the channels for applying heat to, maintaining heat in or withdrawing heat from them, as heretofore more particularly described and as hereafter disclosed in conjunction with the manner of practicing the invention. In Fig. 3 the channels 37 have been illustrated as having burners 38, cooling conduits 38a, and insulation 38b in them.

Means are provided for supporting blocks 35 and 36, and in the particular form shown in Fig. 3 these means simultaneously serve to secure these blocks in position. These means include angles 39 which enclose the ends of blocks 36 and engage also with the cast refractory blocks 35.

Shims or filler strips 40 of required thicknesses are used to take care of varying thickness in the blocks 36 so that the angles 39 may grip both of the blocks simultaneously. Horizontally extending spanner bars or angles 41 hold the vertically extending angles 39 in position, and relatively heavy angles 42 are employed, together with tightening screws 43, for holding the horizontal spanner bars 41 in position. It will be seen that by this construction the joints between the cast refractory blocks 35 are open to the atmosphere so that cooling means can be applied against the joints, or so that the glass will freeze in case it works through the joints and becomes exposed to the air.

Figures 4, 5:
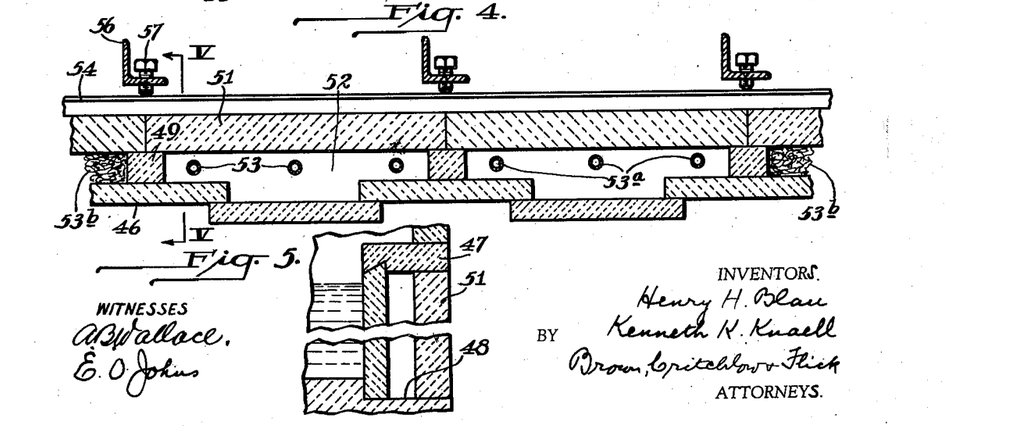
Fig. 4 is a cross-sectional view through the wall of a tank showing another modified wall construction.
Fig. 5 is a cross-sectional view taken on line V—V of Fig. 4, illustrating a manner in which the blocks may be held in position in the side walls.

In Figs. 4 and 5 are illustrated another modification of the channel-forming feature of the invention wherein the cast refractory slabs are formed with lap joints at their adjoining edges. The numerals 46 indicate a plurality of relatively long slabs of cast refractory joined at their sides with lap joints and secured at their upper edges in a groove formed in the tuckstone 47 of the tank and supported at their lower ends on the bottom wall of the tank in suitable grooves 48. Thus each slab 46 preferably extends completely from the bottom to the top of the glass-engaging portion of the tank. Positioned behind alternate cast refractory slabs 46 are vertically extending spacers 49 of refractory material which serve to carry thrusts transmitted from the slabs to insulating refractory blocks 51 preferably made of ordinary bonded refractory and serving to form the outer walls and at the same time to define channels 52 between the slabs 46 and these blocks. Means are associated with the channels 52 for applying heat to, maintaining heat in, or withdrawing heat from the channels, and thus the glass in contact with the cast refractory blocks forming one side wall for the channels. In the embodiment of the invention illustrated in Figs. 4 and 5 burners 53 are employed for adding heat to the channels, conduits 53a for cooling the channels, and insulating means 53b.

The blocks 51 are supported in any suitable manner and in the form of the invention illustrated horizontally extending spanner bars 54 are employed in conjunction with relatively heavy angles 56 having screws 57 associated therewith for adjustably clamping on the spanner bars 54.

Figure 6:
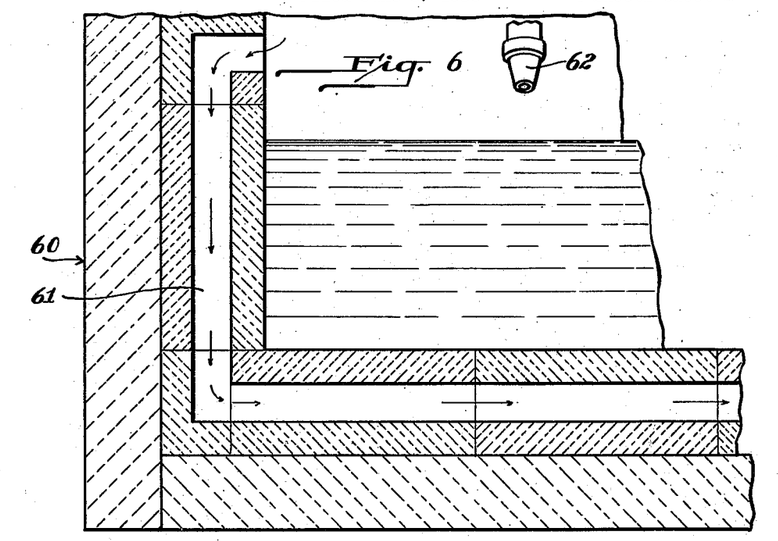
Fig. 6 is a cross-sectional view through a tank bottom and side wall illustrating a form of the invention wherein gases from above the glass are passed through the side and bottom walls of the tank to heat the glass through the walls of the tank.

While the invention particularly contemplates employing additional means for supplying heat to the passageways in the walls of the tank structures as heretofore described, nevertheless the invention contemplates the use of products of combustion from above the glass by conducting them through the walls of a tank. Thus, as shown in Fig. 6, a typical tank 60 has a passageway 61 formed in its side and bottom walls, the passageway opening to the interior of the tank above the metal line. The other end of passageway 61 is connected to a stack or other draft-forming means so that hot products of combustion from above the glass, as provided for example by burners 62, are drawn through the passageway, as best shown by the arrows, to effect a heating of the glass through the side and bottom walls of the tank. The walls of the refractory defining the passageway 61 are preferably made of cast refractory so that the high thermal conductivity of this material will aid in the transfer of heat from the passageway to the glass in the tank. If found necessary or desirable the temperature of the fluid in the passageway 61 may be increased by the use of burners or the like placed directly in the passageway.

It is furthermore part of the inventive concept to pass cooling air through the channels or ducts provided for cooling and then use the resulting heated air for purposes of combustion to heat other portions of the furnace. This operation particularly adapts itself for use with auxiliary water or like cooling pipes in the cooling channels since the amount of air used for cooling need not exceed that which can be advantageously employed for combustion of the fuel in the glass tank.

While in the past tanks have customarily been made of relatively heavy blocks of dimensions approximately 8 to 15 inches thick, 12 to 36 inches wide and 18 to 44 inches high, the present invention contemplates a beneficial departure from such forms of construction by the provision of a tank having its walls made of cast refractory of relatively small shapes and sizes, and in one example approximating the size of the ordinary building brick. By making the tank of cast refractory formed in ordinary building brick sizes, the necessity of a special form for each block is overcome, with substantial advantages. Among these advantages is the reduction of expense for particular block sizes and shapes, and also there is a reduction in labor and handling charges both in shipping of the materials and the building of the tank. It is also desirable to cast the refractories in blocks of small size to avoid piping and other casting and treating difficulties. Such small sizes and shapes can be used if made from highly resistant materials which are of higher density than glass, such as high alumina refractories. A suitable material is beta alumina formed by fusing alumina and about 5 per cent of sodium oxide, the material being cast to form desired shapes.

Figure 7:
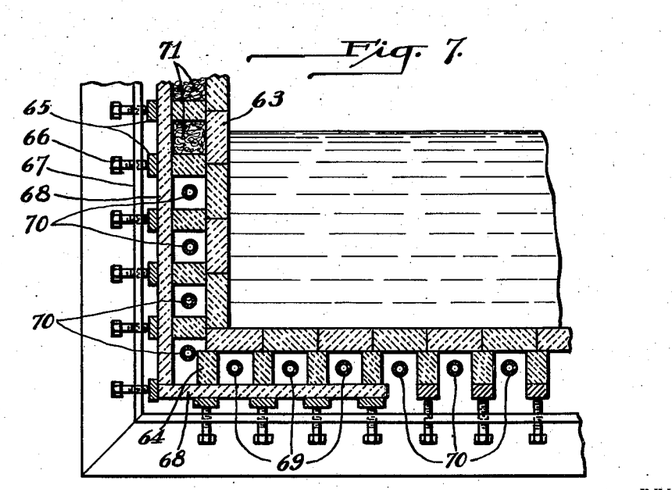
Fig. 7 is a cross-sectional view through the bottom and side walls of a tank illustrating a modification of the invention.

Referring to Fig. 7, a tank is shown having its walls made from cast refractory brick-size blocks 63 which are so laid that the walls of the tank are relatively thin. The bricks 63 may be mounted in any suitable manner as, for example, the edges of the bricks may be formed with grooves which receive clamping angles that serve to support a whole course of the bricks. However, in the form of the invention shown, refractory blocks 64 are positioned behind each brick 63, and horizontally extending spanner bars 65, held in place by adjustable screws 66 carried in heavy angles 67, are utilized to hold the blocks 64 in position. The tank structure shown in Fig. 7 can readily be adapted for the transfer of heat through its walls by merely covering with walls 68 of ordinary refractory the channels formed behind the bricks 63 by the blocks 64. Heat may be applied to, maintained in or withdrawn from the cast refractory bricks 63 to effect heating of or convectional currents in the glass, as more fully described hereinafter. Burners are shown at 69, cooling means at 70 and insulating means at 71.

The cast refractory bricks 63 may also be made in a uniform size somewhat larger than usual brick size while retaining many of the advantages heretofore discussed. Preferably the thickness of the refractory in the form shown in Fig. 7 and also in the several embodiments heretofore described does not exceed approximately 4 inches to best realize the advantages of this invention. While the embodiment of the invention shown in Figs. 1 and 2 is described as incorporating the advantage of ease in construction, and particularly in repair, due to individual supports for the courses of bricks, nevertheless the structure shown in Fig. 7 is likewise easy to repair in that the bricks 63 are usually smaller than the channel-shaped blocks seen in Figs. 1 and 2. It should be understood, however, that the channel blocks in Figs. 1 and 2 may be made in substantially any size, as may the blocks and slabs of the several forms of the invention shown in Figs. 3, 4, 5, and 6 in order to best obtain the advantages of the invention.

Our improved methods are particularly adapted to be practiced in the use of the apparatus or tank structures heretofore described. These structures readily lend themselves to methods of definitely effecting the mixing, heating and melting of glass by controlling the flow of heat through tank walls. The methods are accordingly illustrated diagrammatically in conjunction with the tank structures herein disclosed, it being understood that any of the several modifications described above can be used in practicing our methods.

Figure 8:
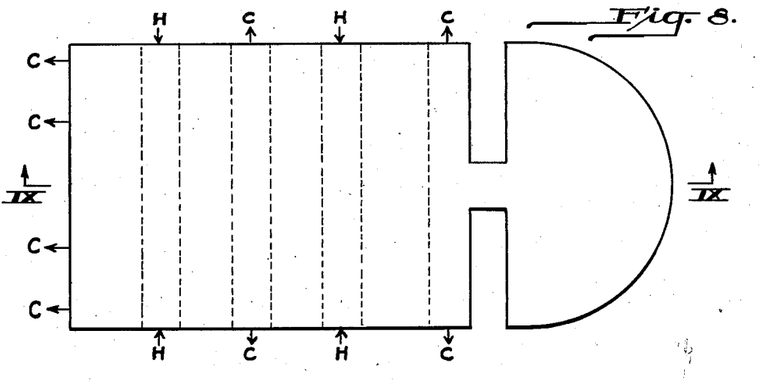
Fig. 8 is a diagrammatic plan view of a tank illustrating a manner of practicing the invention to establish and control definite convectional flow of glass in the tank.
Figure 9:
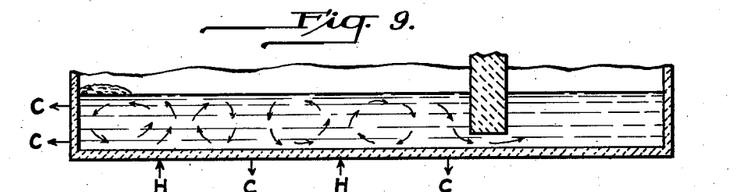
Fig. 9 is a longitudinal cross-sectional view taken on line IX—IX of Fig. 8 diagrammatically illustrating the direction of convectional currents in the glass.

Referring particularly to Figs. 8 and 9, the invention contemplates establishing definite longitudinally spaced, transversely extending zones of alternate heating and cooling in a tank, and the consequent establishing of convectional current flow of a particular character resulting in a thorough mixing and melting of the glass throughout substantially its entire depth. In Fig. 9, for example, heat is applied in the zones and in the direction shown by the arrows and identified by the letter H. By the application of cooling means or media, heat is withdrawn in the zones and directions shown by the arrows marked C. Dotted lines generally indicate the limits of the areas of application and withdrawal of heat so that, as best seen in the vertical longitudinal sectional view of the tank shown in Fig. 9, convectional currents are established in the glass which cause a revolving of volumes of glass in the tank. The result is a materially improved melting and mixing of the glass to render it of substantially uniform fluidity throughout the entire tank.

A feature of the convectional control of glass flow in a tank is the application of cooling means to the back or batch-charging end wall of the tank as is shown in Figs. 8 and 9. Thus the batch material fed to the tank is prevented from flowing forwardly in the tank by the backward and downward convectional flow of the glass so that unmelted batch material is not carried through the throat to the refining end of the tank but is kept at or near the surface where it is exposed to heat.

Figure 10:
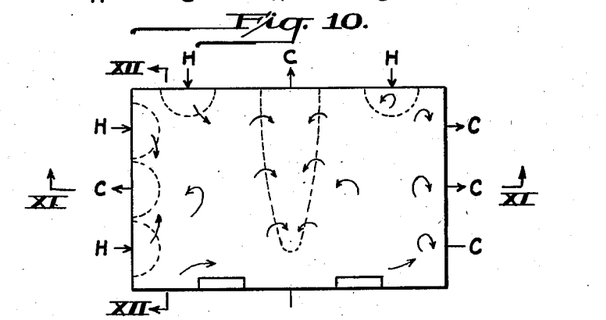
Fig. 10 is a diagrammatic plan view of a day tank and the manner of establishing convectional currents therein.
Figure 11:
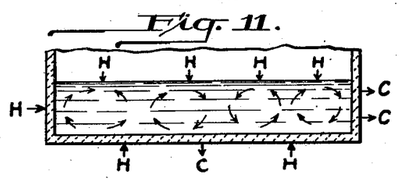
Fig. 11 is a longitudinal cross-sectional view taken on line XI—XI of Fig. 10 further illustrating convectional currents in the glass.
Figure 12:
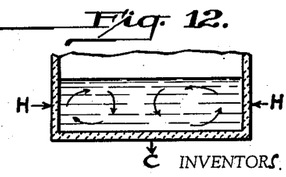
Fig. 12 is a transverse cross-sectional view taken on line XII—XII of Fig. 10 and likewise illustrating the direction of the convectional currents in the glass.

The principles of the invention can be readily applied to day tank glass manufacture, one of the serious objections to the use of which has been that the molten glass has not been uniform in quality or composition due to ineffective heating and melting. Accordingly, in Figs. 10, 11, and 12 there is shown one method of establishing definite convectional flow in a day tank with heat applied through its walls to render the glass uniformly fluid and to improve the quality and increase the quantity of the glass produced therein. In the method illustrated in these drawings, heat is applied to the walls of the tank which may be made according to any of the several modifications heretofore described, the heating means being substantially in the zones illustrated by the dotted lines and marked by the letter H. Certain alternate zones in the tank are subjected to heat withdrawal, or the application of cooling means, and these zones are defined by dotted lines and also with arrows marked C identifying the direction and application of cooling means. One entire wall of the day tank may be cooled to pull the batch material toward it, as heretofore described in conjunction with the continuous tank. The alternate application of heating and cooling means in the manner shown establishes definite and controlled convectional currents in the glass as shown by the arrows in Figs. 10 to 12. A complete mixing and refining of the entire body of glass in the tank is accordingly achieved.

Figure 13:
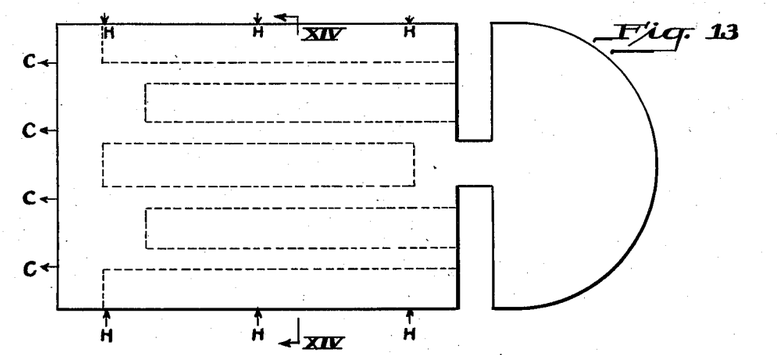
Fig. 13 is a diagrammatic plan view of a modified manner of establishing and controlling convectional flow in a glass tank.
Figure 14:
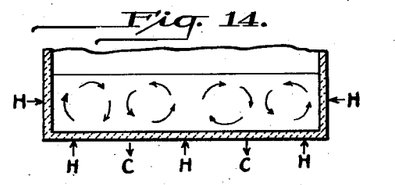
Fig. 14 is a cross-sectional view taken on line XIV—XIV of Fig. 13 further illustrating the direction of convectional flow.

Another method of controlling heat and effecting consequent convectional flow of glass in a continuous tank is illustrated in Figs. 13 and 14. In this way of practicing the invention the rear or feeding wall of the tank is cooled to withdraw heat, as indicated by the arrows C. Extending longitudinally of the tank are transversely spaced zones of alternate application and withdrawal of heat. These zones are defined by dotted lines, and in Fig. 14 arrows show the general direction and character of the convectional currents that are established. Application of heat to the bottom of the tank, which may be by any of the structures above described, is indicated by arrows and the letter H. Withdrawal of heat is indicated by arrows and the letter C.

The convectional currents thus established in the glass body, as best seen in Fig. 14 effect a thorough mixing and melting of the glass which is rendered of substantially the same fluidity throughout the entire tank. Moreover, the application of heat through the side walls of the tank and through the bottom of the tank near the side walls effects a convectional flow of glass away from the side walls as seen in Fig. 14 so that corrosive action of the glass on the side walls is minimized.

The invention contemplates various other methods for increasing the quantity and improving the quality of glass produced in a tank. For example, concentric circles, squares, rectangles and the like of alternately heated and cooled zones may be provided in a tank to effect the mixing and melting desired. Likewise other arrangements of the heating and cooling means may be used to improve the character of the glass produced.

Figure 15:
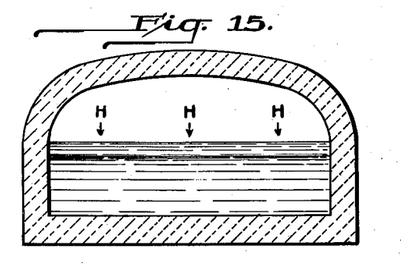
Fig. 15 is a diagrammatic illustration of a transverse section of a former type of glass tank wherein only a relatively thin layer of glass is rendered highly fluid at the upper surface of the tank with the remainder of the glass in the tank being relatively cool, heavy and viscous.
Figure 16:
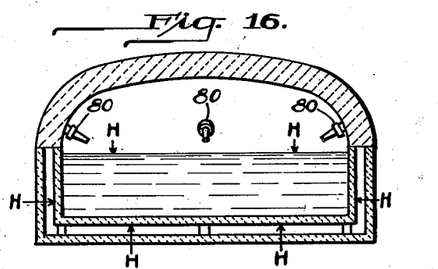
Fig. 16 is a view similar to Fig. 15 but illustrating the improved conditions present in a tank constructed and operated in accordance with the present invention so that the entire body of glass in the tank is rendered fluid and is uniformly mixed and melted.

One feature of the invention and its inherent advantage are illustrated in Figs. 15 and 16 of the drawings, the former of which illustrates diagrammatically a cross-sectional view through a glass-melting tank of the type customarily used, wherein the glass is heated solely from above. In this practice the glass in the bottom of the tank frequently remains heavy and viscous and stays in the tank for long periods. This is because the upper surface of the glass becomes highly heated and fluid and is drawn from the tank without staying in it for a proper refining period. The relatively rapid flow of a comparatively thin layer of glass in the tank obviously impairs the quantity, to say nothing of the quality, of the glass which might otherwise be produced by the tank.

Fig. 16 diagrammatically illustrates a cross-sectional view through a tank embodying the features of the present invention, the glass in the tank being heated not only from the top, as by burners 80, but also locally through the side walls and bottom of the tank whereby the entire volume of glass is rendered fluid. Because of the convectional currents so established, the fluidity of the glass is substantially constant throughout the entire tank. Thus, the quality of the glass produced is considerably improved and the quantity produced per unit of time is materially increased.

Figure 17:
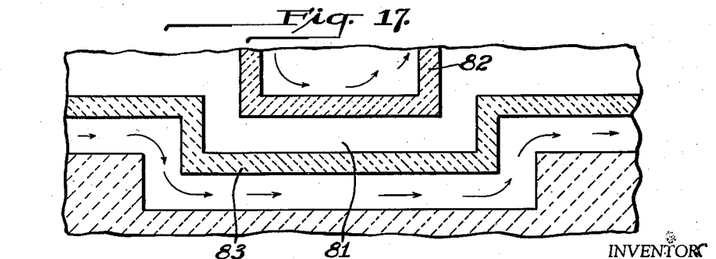
Fig. 17 is a longitudinal cross-sectional view through a tank throat constructed in accordance with the present invention.

The herein-described principles of tank construction and methods of operation can be applied to particular portions of the tank as will be understood. For example, in Fig. 17 is shown a cross-sectional view of a throat construction including a passageway 81, a bridge wall 82 and a tank bottom 83. The tank bottom and bridge wall are both formed of relatively thin cast refractories of high heat conductivity and are provided with passageways for the introduction of heating means behind the cast refractory to heat the glass flowing through the throat and thereby render the entire cross-sectional area of the throat available for glass flow. The invention contemplates using the principle just described in conjunction with the flow of glass through any portion of the tank or channel, the walls of the channel being formed of cast refractories of high heat conductivity and having heating means positioned in passages for heating the glass in the channel.

A feature of the invention not heretofore discussed resides in the provision of refractories of different heat absorption characteristics. More specifically certain of the refractory members positioned in zones adapted to cool the glass may be made of black or dark colored refractories so that heat, and particularly infra-red heat rays, are more readily absorbed thereby to effect the desired cooling. Likewise in zones adapted to heat the glass white or light colored refractories may be used to prevent heat and infra-red heat rays being taken up thereby. This combination of light and dark colored refractories can be employed in conjunction with or separately from the constructions herein described and illustrated.

From the foregoing it will be evident that the stated objects of the invention are attained by tank structures particularly formed and adapted to increase the quantity and improve the quality of glass produced. The tank structures are relatively low in initial and maintenance costs and adapt themselves to the practice of improved methods of mixing and melting glass by control of heat flow through the walls of a tank and establishing convectional currents in the glass.

In the practice of the invention a tank of a given size can be constructed and operated with a distinct increase in production over that of a similarly sized tank of former constructions. Also a smaller tank made and used in accordance with the principles herein disclosed effects the same production as a larger prior art tank or a prior art tank using a greater amount of fuel for melting the glass.

In the claims the terms "wall" and "walls" are intended to include any glass-engaging or associated surfaces of the tank regardless of whether the walls are bottom, side or end walls standing vertically, horizontally or inclined.

Although in accordance with the patent statutes several embodiments of the invention and the manner of practicing the invention have been illustrated and described in detail, it should be understood that the invention is not limited thereto or thereby but is defined in the appended claims.

We claim:

1. A glass-melting tank having a wall provided with a passageway for a temperature-controlling fluid, that portion of the wall positioned between the passageway and the tank being formed of a relatively thin cast refractory of high thermal conductivity to facilitate exchange of heat between molten glass in the tank and temperature-controlling fluid in the passageway.

2. A glass-melting tank having part or all of its bottom and side walls constructed of a plurality of cast refractory channel-shaped blocks having their channel faces away from the glass, means for individually holding the blocks in position, outer refractory blocks covering the channel openings in the cast refractory blocks, means for individually supporting the outer refractory blocks, means for supplying heat to certain of the channels, means for withdrawing heat from other of the channels, and means for heat-insulating other of the channels.

3. In combination in a glass-melting tank, means for supplying heat over glass in the tank, a glass-contacting wall having a passageway therethrough substantially parallel to the glass-contacting surface of the wall, said passageway having an inlet opening in the tank above the glass for withdrawal of products of combustion from the tank through the passageway to heat the glass through the wall.

4. A glass-melting tank having its bottom and side walls constructed of a plurality of cast refractory channel-shaped blocks having their channel faces away from the glass, means for individually holding the blocks in position, outer refractory blocks covering the channel openings in the cast refractory blocks, and means for individually supporting the outer refractory blocks.

5. A glass-melting tank including relatively thin walls made of refractory having high thermal conductivity, means for heating the glass from above, and means for heating the entire body of the glass through the walls to render the molten glass of substantially uniform fluidity throughout the entire tank to thereby increase the quantity and improve the quality of the glass produced.

6. A glass-melting tank comprising glass-contacting side, end and bottom walls made of cast refractory bricks of relatively high thermal conductivity, density and of small size, means for cooling the batch-charging end wall, means positioned to heat the glass in transversely extending longitudinally spaced zones through the tank walls, and means positioned between the heating means for cooling the glass through the tank walls in the alternate zones between the heated zones.

7. A glass-melting tank comprising glass-contacting side, end and bottom walls made of cast refractory blocks of relatively high thermal conductivity, density and heat-resistant characteristics, said blocks being positioned so that the walls are less than four inches thick, and means for controlling the direction and flow of heat through the walls.

8. In a glass-melting tank a wall formed of relatively thin cast refractory blocks having relatively high thermal conductivity, said blocks having lap joints at their adjoining edges, U-shaped backing blocks of bonded refractory covering all of the cast blocks except the joints and defining channels in the wall of the tank, means for simultaneously clamping the cast and bonded blocks in position, and means in the channels for controlling the direction and amount of heat flow through the cast blocks.

9. A glass-melting tank having a wall formed of relatively thin cast refractory blocks having relatively high thermal conductivity, certain of said blocks being of dark colored refractory and positioned to define an area, means for withdrawing heat from the blocks, other of said blocks being of light colored refractory and positioned to define an area adjacent the first-named area, and means for supplying heat to said other blocks.

10. That method of melting a glass batch in a tank, which comprises heating the glass from above, and simultaneously heating the glass through at least certain of the side, end and bottom walls of the tank to render the glass fluid and of substantially the same viscosity throughout the entire tank.

11. The method of melting and mixing glass in a tank, comprising applying heat directly to the upper surface of the glass, applying heat in zones to the glass through the walls of the tank, withdrawing heat in other zones from the tank through the walls to cause definite convectional currents in and a thorough mixing and melting of the glass.

12. The method of melting and mixing glass in a tank, which comprises applying heat to the upper surface of the glass, cooling the glass through the batch-charging end wall of the tank, heating the glass in longitudinally spaced, transversely extending zones through the tank bottom and side walls, cooling the glass through the tank bottom and side walls in alternate zones positioned between the heating zones to produce vertical convectional currents in the glass.

13. The method of melting and mixing glass in a tank, which comprises cooling the glass through the batch-charging end wall of the tank, heating the glass in longitudinally spaced, transversely extending zones through the tank bottom and side walls, cooling the glass through the tank bottom and side walls in alternate zones positioned between the heating zones to produce vertical convectional currents in the glass.

14. The method of melting and mixing glass in a tank, which comprises applying heat to the upper surface of the glass body, cooling the glass body through the rear wall of the tank to cause convectional flow of the glass to the rear wall of the tank, applying heat through the bottom wall of the tank in transversely spaced, longitudinally extending zones, withdrawing heat through the bottom wall of the tank in alternate zones between the heat-applying zones to create definite vertical and transverse convectional flow of the glass in the tank to effect thorough mixing and melting.

15. The method of heating glass in a tank comprising applying heat directly to the surface of the glass, and drawing the products of combustion around the side and bottom walls of the tank to heat the glass through its walls substantially uniformly throughout the entire volume of the glass.

16. That method of melting glass in a day tank, which comprises placing the glass batch in the tank, applying heat to the batch from above, applying heat in zones through the side and bottom walls of the tank, withdrawing heat from other zones through the side and bottom walls of the tank to establish definite convectional flow in and mix and uniformly heat the glass throughout.

17. In the process of melting and refining glass those steps which include melting the glass in a tank having walls of high heat conductivity and less than about four inches thick, applying heat to the glass from above, and controlling the quantity and direction of heat flow through the walls of the tank over substantially the entire glass-engaging portion of the tank.

18. The process of controlling flow of glass through a restricted opening such as a throat of a melting tank, which comprises making the opening of cast refractory having relatively high heat conductivity, and heating the glass passing through the walls of the opening by conduction of heat through the cast refractory to the glass.

19. That method of mixing and melting glass in a tank, which comprises establishing a plurality of vertically rotating volumes of glass by the application of heat to the surface of the glass and the application of alternate zones of heating and cooling in the side and bottom walls of the tank.

HENRY H. BLAU.
KENNETH K. KNAELL.